3,428,482
MOISTURE-PROOF TERPOLYMER COATED
CELLOPHANE
Kanji Mayumi, Kamakura-shi, Kiyoshi Yamaki and Akio Konishi, Tokyo, Shigeyuki Suzuki, Sagamihara-shi, and Soji Kiyama, Tokyo, Japan, asisgnors to Kureha Chemical Industry Co., Ltd., Tokyo, Japan, a corporation of Japan
No Drawing. Filed Dec. 21, 1964, Ser. No. 419,562
Claims priority, application Japan, Dec. 28, 1963, 38/70,763
U.S. Cl. 117—145    7 Claims
Int. Cl. B44d 1/22; B32b 23/08; C08j 1/38

ABSTRACT OF THE DISCLOSURE

Moisture-proof cellophane comprising a cellophane sheet coated with a terpolymer consisting of 0.5 to 25% of alpha, beta-unsaturated aldehydes, 10 to 94.5% of vinylidene chloride and the remainder a member selected from the group consisting of acrylonitrile, alkyl esters of acrylic acid, and vinyl chloride.

---

This invention relates to a new process for the manufacture of moisture-proof cellophanes.

Recently, there is a strong and growing demand for moisture-proof cellophanes for use in packaging various substances and materials such as chemicals, drugs, foods, cigarettes and the like.

The conventional plain cellophane is liable to swell and even break especially in the presence of water, and thus it is not suitable for the packaging of wetted or wetting materials such as fresh fish, frozen foods, soap or green vegetables.

Numerous efforts have been made to minimize or avoid this drawback, for instance by treating cellophane with aquasoluble urea resin so as to produce moisture-proof coated films of cellophane. A polyethyleneimine solution has been applied directly and preliminarily on the plain cellophane so as to increase the adhesion between cellophane and moisture-proof film coat of the products.

Experience has shown that the above-mentioned double-coating process is not sufficient to realize the desired durable moisture-proof characteristics of the cellophane. Not only is this conventional process highly complicated to carry out, but also the products of the process are liable to change their characteristic of moisture-proofness and heat-sealability as time passes. Even a separation of the precoated resin layer from the moisture-proof coating may frequently occur.

A further proposed process for this purpose resides in the coating of a solution on the cellophane, including a mixture of a moisture-proof resin and one or more other ingredients, such as polyurethane, resin nitrile, polyethyleneimine and the like to improve the adhering power between the intermediate and the finish coated layers. But, this process has been found also to be unsatisfactory on account of the time-depending decrease in the moisture-proof performance of the products thus obtained.

As an alternative method to increasing the adhesive strength of resinous component to cellophane, copolymers of vinyl chloride, vinylidene chloride, acrylonitrile or acrylic ester with a minor amount of unsaturated dicarboxylic acid or its anhydride have been tried to incorporate a group of carboxylic acid or its anhydride into a copolymer chain of coating resin. However, in general, it is rather difficult to copolymerize unsaturated dicarboxylic acid or its anhydride efficiently with vinyl monomers as used in a conventional emulsion or suspension polymerization system, because the former ingredient is soluble in the aqueous phase. Therefore, moisture-proof cellophanes as produced by the way of coating such copolymer resins cannot provide good moisture-proof and heat-sealing power. In order to incorporate unsaturated dicarboxylic acid into a vinyl polymer chain, copolymerization in organic solvents, i.e. a solution polymerization process has been tried out. However, such a copolymer solution has a strong tendency to increase its viscosity even in the course of storage within one or two months only and its moisture-proofing and heat-sealing power is extremely lowered after a prolonged storage thereof. Furthermore, regulation, recovery or cyclic utilization of the solvent used is a serious problem in practice, because the solvent used in the polymerization is generally different from that used in the manufacture of moisture-proof cellophanes.

The main object of the present invention is to provide a process for the manufacture of moisture-proof cellophanes excellent in their heat-sealing ability, transparency, flexibility and extremely high resistance against possible peeling of the coated resinous film from the cellophane base even in a highly humid atmosphere. Another object is to provide the desired durable products of the kind above referred to in an easy, simple and economical manner.

Another object is to provide the desired products of extremely high anti-blocking nature.

Generally speaking, these and further objects which will become clear as the description proceeds may be accomplished according to the new and novel principle embodied in the invention by coating the cellophane base with a terploymer of vinylidene chloride, alpha, beta-unsaturated aldehyde and at least a member selected from the group comprising of vinyl and vinylidene monomers. Surprisingly it has been found that these copolymers are excellent in transparency, flexibility and adhesive power to cellophane, yet provide the coated products with superior heat-sealing as well as antiblocking property.

Since the new copolymers thus obtained have reactive aldehyde groups in their polymer chain and thus a chemical bond can occur between the aldehyde group and a hydroxyl group of a cellulose molecule of the cellophane, assisted by a physical adhesion caused by hydrogen bonding or Van der Waal's forces, thereby resulting in an extremely strong adhesion between the cellophane and the coated film. The copolymer films on the cellophane are characterized by the fact that they are highly stable and difficult to be peeled off from cellophane even under serious circumstances such as in a highly humid atmosphere under superatmospheric pressure or when dipped in water. The process according to the present invention does not comprise any complicated and expensive steps such as using an anchor-coating reagent between the moisture-proof resin coat and the cellophane base as in the conventional art. It is also possible to incorporate aldehyde groups into copolymers by the novel teaching of copolymerization even in an aqueous medium without using an expensive organic solvent as the polymerization medium as in the case of solution polymerization. The present invention is also characterized by its easier processing steps and better economical aspects than those of the conventional art for manufacturing moisture-proof cellophanes described hereinbefore. The polymerization may be carried out in a solution polymerization system if necessary.

The cellophanes coated with copolymers obtained as above have an excellent moisture-proof and heat-sealing ability, and may well be processed in automatic packaging machines. Another distinctive feature is the excellent antiblocking property as already mentioned.

It is known that polyvinylidene chloride has a good moisture-proofing power, and poly-alpha, beta-unsaturated aldehyde has a better adhesive property to cellulose as described hereinbefore. However, the copolymer obtained from these two monomers is insoluble in common solvents and poor in film-forming property. It has been found that the new terpolymer obtained in the inventive process comprises the third component which enables the copolymer to have excellent film-forming property, flexibility, solubility in common solvent, and also superior transparency and antiblocking power in addition to the above-described advantageous properties.

Alpha, beta-unsaturated aldehydes used in preparing the new copolymers may preferably be selected from acrolein and alpha- or beta-substituted acroleins, in which the substituents are an alkyl or halogen group such as, for example, crotonaldehyde, methacrolein, alpha-chloroacrolein or the like. The amount of the unsaturated aldehydes to be added in the process should preferably be in a range from 0.5% to 25% by weight. In an amount less than 0.5%, the adhering power in the products is poor, and the more the content of the aldehyde component increases, the more the adhesive strength of the copolymer to cellulose and the antiblocking property of the products will increase. On the contrary, the moisture-proof effect will be reduced with use of the latter component in an amount more than 25% or the above-specified maximum value.

The amount of vinylidene chloride to be added should preferably be in a range between 10 and 94.5% by weight. In an amount less than 10%, the moisture-proofness of the film will be poor, and both solubility in solvents film-forming property from its viscous state will also be reduced with use of amounts more than 94.5% as above-specified.

Vinyl- or vinylidene monomers to be copolymerized while preparing the new copolymers are preferably selected from one or more of the following monomers, such as, for example, acrylonitrile, methacrylonitrile, alkyl-, cycloalkyl- or phenyl esters of acrylic or methacrylic acid (for example, methyl acrylate, octyl acrylate, methyl methacrylate, cyclohexyl acrylate or phenyl acrylate), vinyl acetate, vinyl chloride, alkyl vinyl ether and the like. The amount of said monomers to be employed should preferably be in a range between 5 and 90% of the combined mixture of alpha, beta-unsaturated aldehydes, vinylidene chloride and above-described monomers. The amount of said monomers used will vary depending on the amount of alpha, beta-unsaturated aldehydes and vinylidene chloride added and also on the purposes for which the products are to be used. Addition of a too little amount of such monomer may result in the copolymer having poor solubility and film-forming property. On the contrary, if a too great an amount of the monomer is used, it will result in the formation of products having poor moisture-proofing and antiblocking properties. When less than 50% of vinylidene chloride is employed, vinyl chloride may be preferably selected as the other vinyl or vinylidene monomer component to provide a high moisture-proofing power to the copolymer.

In general, the new copolymers as produced in the inventive process may be prepared by way of any of the conventional methods of polymerization. Examples of the method of polymerization may include emulsion- or suspension polymerization in an aqueous medium, solution polymerization in an organic medium, precipitation polymerization, bulk polymerization without use of any polymerization medium, and the like. The copolymerization will be carried out in the presence of proper polymerization initiators depending on the polymerization system employed. Examples of initiators that may be employed include hydrogen peroxide, persulfates, perborates, organic hydroperoxides (for example, cumen hydroperoxide, tertiary butyl hydroperoxide, paramenthane hydroperoxide and the like), organic peracids and the like. These initiators may be used alone or in combination with any of the so-called activating agents, such as, salts of heavy metals, sulphites, acid sulphites and the like as employed commonly in conventional redox polymerization. Particularly favorable results are obtained when an emulsifying or dispersing agent is employed in such polymerization systems. Also various chain transfer reagents may be used to regulate the molecular weight of the copolymers thus produced.

Oil soluble initiators, such as organic peroxides and hydroperoxides, azo compounds such as azobisisobutyronitrile and the like, organo-metallic compounds and the like may be employed in other polymerization systems. Dispersing agent must preferably be used in aqueous suspension polymerizations for the purpose of this invention.

In any case, the copolymerization step must preferably be so carried out that copolymers of higher polymerization degree may be provided.

The copolymers thus prepared may be coated on cellophanes by any of the conventional coating methods. When the copolymer formed in the first or copolymerization step of the inventive process is in the form of an aqueous emulsion, it may be directly applied on cellophanes. The pH of the emulsion must preferably be acidic so as to strengthen the adhesive power, yet in a moderately limited range of acidity to avoid possible degradation of cellophanes. The emulsion method is particularly favored from the economical aspect, since it can be carried out without employing any expensive solvent and thus may eliminate a complicated additional step for recovering the solvent. A further advantage obtainable by this kind of copolymerization resides in the nonflammability of the emulsifying aqueous medium.

Alternatively, the aqueous solution of the copolymer obtained from the emulsifying polymerization step may also be indirectly applied to the cellophanes per se upon salting out, drying, pulverizing and dissolving the coating product in a proper and nonaqueous solvent. Copolymers obtained from either the suspension or precipitation polymerization system if employed, may generally be used for the coating application after drying, pulverizing and dissolving the copolymers in a proper solvent. The copolymers obtained by solution polymerization may be directly applied for such use.

Particularly advantageous results are obtained by heat treating the copolymerization products after coating and drying steps to strengthen the adhesion. Temperatures recommendable for this purpose are selected generally to be higher than 70° C., preferably between 80° C. and 150° C. The heat treatment may extend from about several seconds to about 30 minutes.

The thus prepared moisture-proof cellophanes of the present invention have excellent properties as mentioned hereinbefore and are especially useful for various packaging and wrapping purposes.

Several examples will be given to illustrate the invention more in detail. However, these examples are for the purpose of illustration only and should not be construed for limiting the invention. In these examples, parts will be given by weight when not otherwise specified.

EXAMPLE I

A reaction flask fitted with a thermometer, an agitator and a reflux condenser is charged with the following components, and the polymerization is carried out at 40° C. in a nitrogen atmosphere:

| | |
|---|---|
| Water | 300 |
| Potassium persulfate | 0.5 |
| Sodium metabisulphite | 0.5 |
| Sodium dodecyl-benzene sulphate | 1.0 |
| Vinylidene chloride | 90 |
| Acrylonitrile | 10 |
| Acrolein | 5 |

After 24 hours there is obtained an emulsion of copolymer which comprises distributed particles having a mean size of about 1000 A. as determined by an electronmicroscope. It was found that the solid content of the emulsion was 25% and the conversion rate was about 100%. The copolymer obtained from the emulsion by salting-out and drying was identified as a resin soluble in a common solvent such as tetrahydrofuran, methyl ethyl ketone or methyl isobutyl ketone or the like. The reduced viscosity of the copolymer was 0.045 as measured in a tetrahydrofuran solution.

After drying, transparent and flexible cellophanes were obtained by any one of the following two methods: (A): coating the emulsion directly on a cellophane after regulating the pH of the emulsion to 3.5–4.0; (B): coating a 15% solution of the copolymer in tetrahydrofuran on a cellophane after salting out the copolymer from the emulsion and dissolving the separated resin in the solvent. A moistureproof cellophane having properties as shown in Table I was prepared by heat-treating the coated product at 110° C. for 2 minutes:

EXAMPLE III

The procedure described in Example I was repeated with the exception that the components of monomers were altered as shown in Table III. The copolymerization was carried out to a polymerization degree of nearly 100%, and an emulsion of 24–25% solid content was obtained. The following Table III also demonstrates the properties of the moistureproof cellophane prepared by coating and heat-treating by a similar process to that shown in the foregoing Table I.

TABLE III

| No. | A | B | C | D | E | F | G | H | I |
|---|---|---|---|---|---|---|---|---|---|
| Vinylidene chloride | 90 | 90 | 90 | 90 | 90 | 70 | 90 | 70 | 10 |
| Acrylonitrile | 10 | 10 | 10 | 10 | 10 | | | | |
| Acrolein | 0.3 | 0.5 | 10 | 25 | 30 | 2 | 1 | | 2 |
| Vinyl chloride | | | | | | 30 | | 30 | 90 |
| Methyl acrylate | | | | | | | 10 | | |
| Moisture-permeability (g./m.²/24 hrs.) | 5 | 5 | 8 | 13 | 16 | 11 | 7 | 10 | 18 |
| Stability in water (hrs.) | 2 | 10 | 24 | 24 | 24 | 24 | 20 | 2 (min.) | 24 |
| Blocking temperature (° C.) | 65 | 68 | 78 | 83 | 90 | 70 | 70 | 63 | 70 |
| Heat seal strength (g./15 m./m.) | 170 | 175 | 180 | 170 | 150 | 200 | 190 | 170 | 175 |

It can be acknowledged that excellent results were obtained by the process of the present invention as shown in Examples B, C, D, F, G and I shown in Table III.

It is to be understood that the above-described processing conditions as disclosed in the several foregoing examples are illustrative of the application of the principles of the invention. Other conditions may be adopted as

TABLE I

| Coated Resin | Emulsion of Vinylidene Chloride-Acrylonitrile-Acrolein (90/10/5). | Solution of Vinylidene Chloride-Acrylonitrile-Acrolein (90/10/5). | Solution of Vinylidene Chloride-Acrylonitrile Copolymer (90/1) in Tetrahydrofuran. | Emulsion (Not heat-treated). |
|---|---|---|---|---|
| Appearance | Colorless Transparent | do do | do do | Do. Do. |
| Moisture-permeability¹ (g./m.²/hr.) | 6 | 5 | 5 | 6. |
| Peeling Property² in Water | Stable after 24 hrs | | Peeled off immediately | Peeled off after 1 hr. |
| Blocking Temperature³ (°C.) | 75 | 75 | 70 | 70. |
| Heat Seal Strength⁴ (g./15 mm.) | 180 | 205 | 50 | 125. |

¹ A.S.T.M., E96-53T.  ² Peeling as measured by sticking an adhesive cellophane tape on a number of samples taken up from water bath of 20° C. at certain time intervals and pulling the tape.  ³ Lowest temperature at which a blocking of layers of piled samples occurred after one hour standing under a load of 125 g./cm.².  ⁴ Separating load under which a peel-off was observed between two heat-sealed samples; 15 m./m. width, heat-seal temperature, 120° C.

From the contents of Table I, it may be ascertained that the moisture-proof cellophanes obtained by the process of the present invention are extremely excellent in their moisture-proofness, stability in the presence of water, antiblocking property and heat-sealing ability.

EXAMPLE II

A solution of a copolymer was obtained by carrying out the copolymerization under the following conditions:

| | Parts |
|---|---|
| Vinylidene chloride | 88 |
| Methyl acrylate | 12 |
| Methacrolein | 2 |
| Methyl ethyl ketone | 100 |
| Methyl isobutyl ketone | 50 |
| Toluene | 150 |
| Azobisisobutyronitrile | 1.5 |

Polymerization at: 60° C.
Polymerization for: 70 hrs.

a cellophane was coated with the above viscous solution (solid content: 25%). The coated cellophane was then dried and heat-treated at 100° C. for 3 minutes. The product was also identified as an excellent moistureproof cellophane judged as such from Table II:

TABLE II

| Appearance | Moisture-Permeability (g./m.²/24 hrs.) | Stability in Water | Blocking Temperature, °C. | Heat-Seal Strength |
|---|---|---|---|---|
| Colorless Transparent | 10 | Good after 24 hrs | 65 | 240 g./15 m./m. | occasion desires by those skilled in the art without departing from the spirit and scope of the invention.

What is claimed is:

1. Moisture-proof cellophane comprising a cellophane sheet and a coated layer comprising a terpolymer consisting of 0.5 to 25% of alpha, beta-unsaturated aldehyde, 10 to 94.5% of vinylidene chloride and the remainder a member selected from the group consisting of acrylonitrile, alkyl esters of acrylic acid, and vinyl chloride.

2. Moisture-proof cellophane as set forth in claim 1, wherein said coated layer comprises a terpolymer consisting of 0.5 part of acrolein, 90 parts of vinylidene chloride, and 10 parts of acrylonitrile.

3. Moisture-proof cellophane as set forth in claim 1, wherein said coated layer comprises a terpolymer consisting of 10 parts of acrolein, 90 parts of vinylidene chloride, and 10 parts of acrylonitrile.

4. Moisture-proof cellophane as set forth in claim 1, wherein said coated layer comprises a terpolymer consisting of 25 parts of acrolein, 90 parts of vinylidene chloride, and 10 parts of acrylonitrile.

5. Moisture-proof cellophane as set forth in claim 1, wherein said coated layer comprises a terpolymer consisting of 2 parts of acrolein, 70 parts of vinylidene chloride, and 30 parts of vinyl chloride.

6. Moisture-proof cellophane as set forth in claim 1, wherein said coated layer comprises a terpolymer consisting of 1 part of acrolein, 90 parts of vinylidene chloride, and 10 parts of methyl acrylate.

7. Moisture-proof cellophane as set forth in claim 1, wherein said coated layer comprises a terpolymer consisting of 2 parts of acrolein, 10 parts of vinylidene chloride, and 90 parts of vinyl chloride.

References Cited

UNITED STATES PATENTS

| | | | |
|---|---|---|---|
| 2,541,167 | 2/1951 | Pitzl | 260—80.6 X |
| 2,657,192 | 10/1953 | Miller et al. | 260—80.6 X |
| 2,909,449 | 10/1959 | Banigan | 117—145 |
| 3,085,030 | 4/1963 | Hendrickson et al. | 117—145 |
| 3,144,425 | 8/1964 | Koch et al. | 117—145 X |
| 3,232,784 | 2/1966 | Seibel et al. | 117—145 X |

WILLIAM D. MARTIN, *Primary Examiner.*

M. LUSIGMAN, *Assistant Examiner.*

U.S. Cl. X.R.

117—161; 260—80.6